F. A. JEWETT.
Thill Coupling.
No. 110,367.
Patented Dec. 20, 1870.
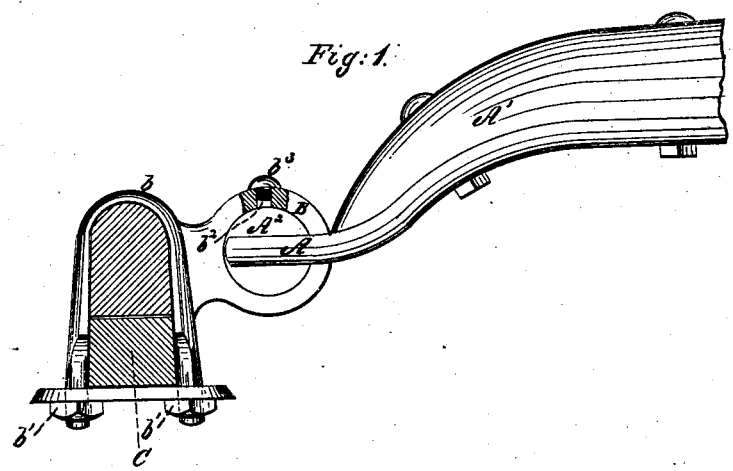
Fig: 1.
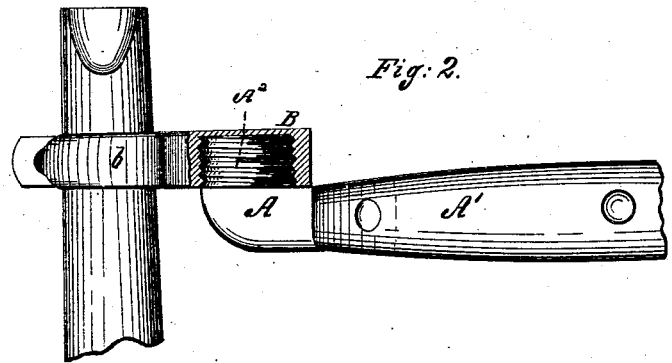
Fig: 2.
Witnesses:
Inventor.

United States Patent Office.

FREDERIC AUGUSTUS JEWETT, OF GRAFTON, MASSACHUSETTS.

Letters Patent No. 110,367, dated December 20, 1870.

IMPROVEMENT IN THILL-COUPLINGS.

The Schedule referred to in these Letters Patent and making part of the same.

*To all whom it may concern:*

Be it known that I, FREDERIC AUGUSTUS JEWETT, of Grafton, in the county of Worcester and State of Massachusetts, have invented a certain new and useful Improvement in Shaft-Couplings for Vehicles; and I do hereby declare the following to be a full, clear, and exact description thereof, reference being had to the accompanying drawing forming a part of the same, and in which—

Figure 1 represents a side view of my invention, which is represented as connecting a shaft to its axle, for which purpose it is designed; and Figure 2 is a plan view thereof, with the receptacle into which the screw portion of the coupling is inserted, taken in section, exhibiting its screw and the screw above alluded to.

This invention relates to shaft-couplings for vehicles, and consists of a screw, formed on the right-angular portion of the plate by means of which shafts are attached to vehicles, in combination with a hollow plate or receptacle provided with means for attaching it to the axle of a vehicle, the chamber of which receptacle being formed with a screw-thread into which fits the screw of the shaft-plate, as hereinafter more fully set forth.

In the two figures of the accompanying drawing, in which similar letters of reference indicate corresponding parts of my invention—

A represents a metal plate, which is screwed or otherwise secured to the shaft $A^1$ of a vehicle.

The right-angular portion $A^2$ of the plate A is cylindrical in form, as seen in fig. 1, and constructed on its periphery or circumference with a screw-thread, as seen in fig. 2.

B is a hollow plate or receptacle, preferably of a cylindrical form, and constructed with a clip or staple, $b$, which embraces one of the cross-pieces of the vehicle to which one end of the reach is attached, and the axle C, and held thereto by the nuts $b^1 b^1$.

The circular chamber of the hollow cylinder or plate B is constructed with a female-screw for the reception of the screw $A^2$ of plate A, and into which it fits and freely works, allowing the shaft or shafts of the vehicle to be readily thrown up out of the way, and preventing them from ever becoming detached from the vehicle.

It will also be remarked that by means of my coupling the friction or wear and tear attending the use of the ordinary shaft-coupling, which consists of a screw-bolt passing through eyes formed on the staple of the axle of the vehicle and eyes on the shafts, is entirely avoided, making it an economical and desirable coupling, both as to durability and expense, as its simplicity will testify in corroboration of the last statement.

The aperture $b^2$ of cylinder B, into which is inserted the screw-plug $b^3$, is for the purpose of allowing lubricating-oils or grease to be admitted to the screw $A^2$ of the plate A, when desired. It is exhibited in the drawing by a section taken through that portion of the cylinder B in which it is located.

Having thus described my invention,

What I claim, and desire to secure by Letters Patent, is—

The metal plate A, provided with the right-angular screw $A^2$, in combination with the cylinder or plate B, constructed with a chamber having a screw-thread, and with the staple $b$, arranged to operate substantially as and for the purpose described.

In testimony that I claim the foregoing as my invention I have hereunto set my hand this 14th day of November, 1870, in presence of two subscribing witnesses.

FREDERIC AUGUSTUS JEWETT.

Witnesses:
HENRY F. WING,
JAMES W. WHITE.